(12) United States Patent
Sobel et al.

(10) Patent No.: US 11,584,520 B1
(45) Date of Patent: Feb. 21, 2023

(54) METHOD AND SYSTEM FOR REGULATION OF SPEED AND POSITION OF A ROTOR IN WING-BORNE FLIGHT

(71) Applicant: Bell Textron Inc., Fort Worth, TX (US)

(72) Inventors: James Sobel, Haslet, TX (US); Carlos Alexander Fenny, Fort Worth, TX (US); Brady Garrett Atkins, Euless, TX (US); Troy Cyril Schank, Keller, TX (US); Charles Eric Covington, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/501,071

(22) Filed: Oct. 14, 2021

(51) Int. Cl.
*B64C 27/57* (2006.01)
*B64C 27/00* (2006.01)
*B64C 27/82* (2006.01)
*F16F 7/10* (2006.01)

(52) U.S. Cl.
CPC ............ *B64C 27/001* (2013.01); *B64C 27/57* (2013.01); *B64C 27/82* (2013.01); *F16F 7/1017* (2013.01); *B64C 2027/002* (2013.01); *B64C 2027/004* (2013.01)

(58) Field of Classification Search
CPC ....... B64C 27/001; B64C 27/57; B64C 27/82; B64C 2027/004; B64C 2027/002
See application file for complete search history.

(56) References Cited

U.S. PATENT DOCUMENTS

| | | | | |
|---|---|---|---|---|
| 5,853,144 A | * | 12/1998 | Vincent ................... | F16F 15/02 244/17.27 |
| 10,875,640 B2 | | 12/2020 | Speller et al. | |
| 2013/0183169 A1 | * | 7/2013 | Buono ...................... | F04B 9/08 417/212 |
| 2015/0298818 A1 | * | 10/2015 | Garcia .................... | B64C 27/82 244/17.27 |
| 2018/0050796 A1 | * | 2/2018 | Wittmaak ................. | B60L 7/02 |
| 2019/0016451 A1 | * | 1/2019 | Ehinger ................... | B64C 27/28 |
| 2019/0033862 A1 | * | 1/2019 | Groden ............... | G08G 5/0086 |
| 2019/0071172 A1 | * | 3/2019 | Caldwell ................. | B64C 27/64 |
| 2019/0241251 A1 | * | 8/2019 | Atkins ................... | F16K 31/047 |

\* cited by examiner

*Primary Examiner* — Tye William Abell
(74) *Attorney, Agent, or Firm* — Shackelford, Bowen, McKinley & Norton, LLP

(57) ABSTRACT

A rotor-regulation system includes a rotor comprising a plurality of blades, a mechanically driven hydraulic pump, a rotor drive shaft operable to drive the rotor and the mechanically driven hydraulic pump, and a throttling valve coupled to the mechanically driven hydraulic pump and operable to modulate rotation of the rotor.

18 Claims, 2 Drawing Sheets

METHOD AND SYSTEM FOR REGULATION OF SPEED AND POSITION OF A ROTOR IN WING-BORNE FLIGHT

TECHNICAL FIELD

The present disclosure relates generally to regulation of speed and position of a rotating element and more particularly, but not by way of limitation, to regulation of speed and position of a rotor in wing-borne flight.

BACKGROUND

This section provides background information to facilitate a better understanding of the various aspects of the disclosure. It should be understood that the statements in this section of this document are to be read in this light and not as admissions of prior art.

Rotor indexing of rotorcraft is a term used to describe turning of rotor blades to a predetermined azimuthal position. Rotor indexing is not uncommon in rotorcraft on the ground, such as, for example, the Bell V-22 OSPREY VTOL rotorcraft, in which rotor indexing is part of a rotor-blade fold and wing-stow sequence.

However, rotor indexing while the rotorcraft is in wing-borne flight presents particular challenges. For example, early attempts at in-flight indexing used a system in which a peg was dropped in a hole of a rotor system to stop and position the rotor. This approach generated high-impact loads to the rotor system that could cause structural issues such as fatigue and limited component life.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A rotor-regulation system includes a rotor comprising a plurality of blades, a mechanically driven hydraulic pump, a rotor drive shaft operable to drive the rotor and the mechanically driven hydraulic pump, and a throttling valve coupled to the mechanically driven hydraulic pump and operable to modulate rotation of the rotor.

A method of modulating rotation of a rotor including a plurality of blades includes rotating the rotor and a mechanically driven hydraulic pump via a rotor drive shaft, receiving information indicative of a position and rate of angular rotation of the rotor, and responsive to the receiving step, modulating rotation of the rotor via a throttling valve coupled to the mechanically driven hydraulic pump.

DETAILED DESCRIPTION

Figure 1:
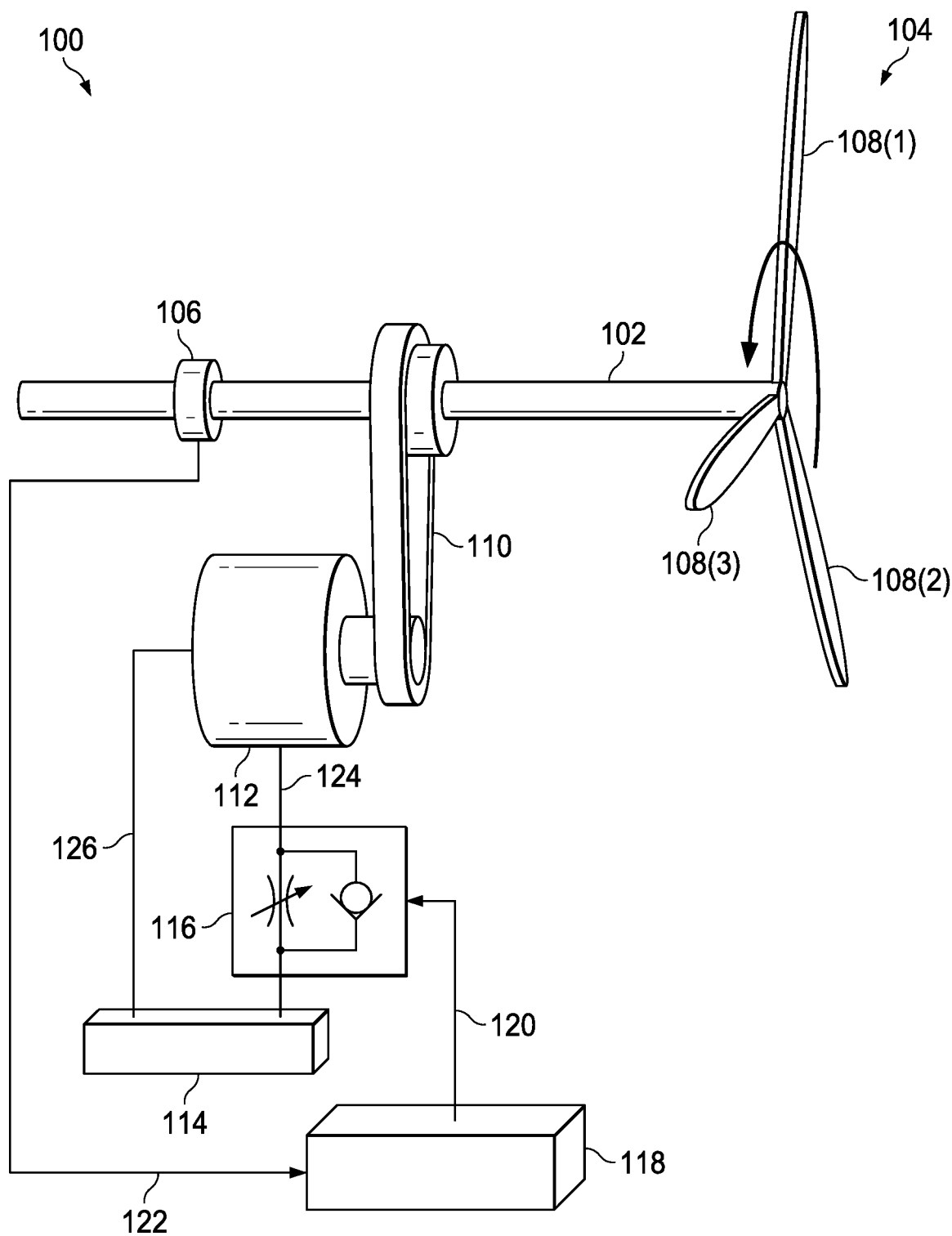
FIG. 1 is a diagram that illustrates a rotor-regulation system.

Various embodiments will now be described more fully with reference to the accompanying drawings. The disclosure may, however, be embodied in many different forms and should not be construed as limited to the embodiments set forth herein.

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

Blade feathering is a term used to describe changing rotor blade angle or pitch. Blade feathering influences the rotor blade's angle of attack. A rotor blade feathers along its longitudinal axis. Blade feathering increases the angle of pitch of the rotor blade by turning the rotor blade such that it approaches parallel to an airstream encountered by the rotor. Blade feathering reduces aerodynamic moments that remain imparted on the rotor following, for example, engine failure in flight.

A blade feathering angle is in most cases ideally directly into the airstream; as such, if the blade feathering angle is not ideal, some rotation of the rotor will occur. Given a residual non-ideal blade feathering angle, aircraft angle of attack, and residual engine idle torque, the rotor will come to an equilibrium rotation speed that reduces rotor net torque to zero. If the rotating rotor speed is mechanically arrested through for example, a brake, residual aerodynamic forces on the rotor will increase as the RPM changes from equilibrium. At the fully-stopped condition, a significant amount of static torque can be generated by aerodynamic loads on the rotor blades.

If rotor rotation occurs due, for example, to a residual non-ideal blade feathering angle, stopping the rotor increases static rotor torque. Such increased rotor torque can be relatively large even at low rotor rotational speeds due, for example, to the size of the rotor.

Various embodiments address the problem of how to arrest and index a rotor system in wing-borne flight after feathering of rotor blades and removal of drive-shaft torque in total or other than residual idle torque. Thus, in various embodiments, the rotor blades can be folded into a stow lock position after the rotor has been positioned in a correct indexing location. Transition from turbo-prop powered flight to turbo-fan powered flight is a typical application of rotor indexing and stowage as discussed herein.

Even when rotor blades have been fully feathered during wing-borne flight, a feathering angle is often not perfect, such that residual revolution of the rotor can remain. As such, high torque loads can build up if the rotor is arrested during indexing. Therefore, a compact and efficient way to achieve rotor indexing that takes advantage of the prevailing rotor loads is desirable.

Accomplishing of rotor stop/fold during flight is particularly desirable, although not necessarily limited to, high-speed VTOL rotorcraft.

Referring now to the FIGURES, FIG. 1 is a diagram that illustrates a rotor-regulation system 100. The rotor-regulation system 100 as shown is an energy-absorbing system that can be used to modulate rotation of one or more rotors and includes a rotor drive shaft 102 by adjusting a load on the rotor-regulation system 100 to slow rotation of the one ore more rotors.

A rotor 104 is coupled to the rotor drive shaft 102, the rotor drive shaft 102 providing rotation to the rotor 104. A rotor transducer 106, which outputs data indicative of at least an azimuthal position of the rotor 104, is coupled to the rotor drive shaft 102.

The rotor 104 as shown is comprised of three rotor blades, which rotor blades are illustrated with reference numerals 108(1)-(3). Those having skill in the art will appreciate that a different number of rotor blades can be employed without departing from principles of the invention. A drive belt 110 is coupled to the rotor drive shaft 102. Rotation of the rotor drive shaft 102 causes the drive belt 110 to power a mechanically driven hydraulic pump 112.

Although FIG. 1 illustrates the drive belt 110, a gear box or other drive mechanism could be used to interconnect the rotor drive shaft 102 and the mechanically driven hydraulic pump 112. In similar fashion, although not explicitly depicted in FIG. 1, various clutching mechanisms could be employed, for example, so that the mechanically driven hydraulic pump 112 doesn't need to turn at high rotor speeds, but rather only after the rotor blades have been feathered and rotor speeds have been reduced. Moreover, it should be understood that a transmission colud be utilized, for example, to vary a gear ratio at different speeds, particularly if the mechanically driven hydraulic pump 112 is used to generate hydraulic energy at normal rotor speeds. In a typical embodiment, the mechanically driven hydraulic pump is a fixed-displacement hydraulic pump.

A fluid reservoir 114, a throttling valve 116, and a computer 118 are also illustrated. A valve-control line 120 is connected between the computer 118 and the throttling valve 116, the valve-control line 120 permitting the computer 118 to control opening and closing of the throttling valve 116. Although FIG. 1 illustrates the computer 118 as being operably interconnected with the single rotor 104, it will be understood that, in some embodiments, the computer 118 controls two or more rotors 104, for example, in a rotorcraft that employs multiple rotors 104.

Also illustrated is a transducer-signal line 122 that provides signal(s) indicative of at least the position of the rotor 104 to the computer 118. A hydraulic-fluid outlet line 124 is connected between the mechanically driven hydraulic pump 112 and the fluid reservoir 114 via the throttling valve 116. A hydraulic-fluid return line is connected between the fluid reservoir 114 and the mechanically driven hydraulic pump 112 and provides return hydraulic fluid to the mechanically driven hydraulic pump 112. In a typical embodiment, the fluid reservoir 114 helps provide extra fluid to account for leakage. In some embodiments, extra fluid to account for losses can be sourced via another hydraulic system.

In a typical embodiment, the rotor-regulation system 100 does not provide directional control but rather only braking force on the rotor 104. In other words, in such an embodiment, the rotor-regulation system 100 merely serves to control rotation of the rotor 104 in a given direction and does not impart power to the rotor 104 so as to cause the rotor 104 to rotate in an opposite direction. Thus, in order to control the rotation of the rotor 104 prior to indexing the rotor 104, a typical embodiment only has the ability to place a varying braking force on the rotor via controlled operation of the throttling valve 116. The absence of directional control tends to allow the rotor-regulation system 100 to be simpler in design, lighter in weight, and more robust than a comparable system that can directionally control the rotor 104. In other embodiments, the rotor-regulation system 100 is operable to recognize rotor-rotation direction and successfully index and bias the rotor 104 accordingly in either rotational direction.

Factors that influence the rotational speed of the rotor 104 include the blade feathering angle and residual engine torque driving the rotor drive shaft 102. In a typical use case, the rotor 104 rotates in a particular direction (e.g., counter-clockwise) and the rotor-regulation system 100 controls the speed and position of the rotor 104 as it spins in that direction. As noted above, a system that cannot make the rotor 104 turn in the opposite direction tends to be simpler and less prone to component failure under most circumstances.

An algorithm can be employed by the computer 118 to cause the rotor 104 to stop at a desired azimuthal position for rotor indexing. In a typical embodiment, blade-feathering bias may be determined so as to cause the rotor 104 to resist residual engine torque such that undesirable total net rotor torque that the indexing system must overcome is minimized. Flow restriction of the mechanically driven hydraulic pump 112 is used to modulate rotational speed of the rotor 104. The flow restriction is controlled via the computer 118, which monitors a signal from the rotor transducer 106 and performs an algorithm to control the speed and position of the rotor 104. The algorithm monitors, for example, the position and speed of the rotor 104 in order to control the rotor rotation and selectively controls the throttling valve 116 coupled to the mechanically driven hydraulic pump 112 to regulate the speed and final position of the rotor 104 prior to indexing. In a typical embodiment, a load on the mechanically driven hydraulic pump 112 is changed in order to vary an amount of braking force the mechanically driven hydraulic pump 112 exerts on the rotating rotor 104. If the load on the mechanically driven hydraulic pump 112 is kept relatively high, relatively greater resistance on the rotating rotor 104 from the mechanically driven hydraulic pump 112 will remain; in contrast, if the load is reduced by opening of the throttling valve 116, the mechanically driven hydraulic pump 112 exerts relatively less resistance on the rotating rotor 104 and thus allows the rotor 104 to rotate more freely.

In a typical embodiment, the algorithm employed by the computer 118 only addresses indexing of the rotor 104 and does not address an amount of blade feathering of the rotor 104. In such an embodiment, as the rotor blades 108(1)-(3) are feathered, the rotor blades 108(1)-(3) hit respective hard stops that hold the rotor blades 108(1)-(3) at the full limit of their feather travel capability; however, there is some variability in the final blade feathering angles due to mechanical rigging and structural twist and residual torque applied to the rotor 104 due t oflight conditions such as aircraft incidence and air disturbances. When the rotor blades 108(1)-(3) are at the fully feathered positions, control of the final blade-feathering angle is often impractical; therefore, controlling the mechanical rotation of the rotor blades 108(1)-(3) and not the aerodynamic blade feathering is a solution that does not require that the blade feathering angle be precisely controlled when the rotor blades 108(1)-(3) approach a maximally feathered state. In such a solution, an amount of residual engine torque applied to the rotating rotor 104 through the mechanically driven hydraulic pump 112 is modulated in order to bias the total rotor torque appropriately for rotor indexing. In addition, biasing of the rotor could be achieved via an aerodynamic surface, such as, for example, movable trim tabs on the blades, active blade twist, individual blade control, adjusting snog mount displacement from a mast structure, etc. The biasing could be done actively or statically via one or both of design bias offsets and rigging/shimming.

The rotor-regulation system 100 inherently has losses, such as, for example, internal leakage losses in the mechanically driven hydraulic pump 112. In such cases, a supplemental system (not shown) can be utilized that applies additional pressure and hydraulic-fluid flow to the rotor-regulation system 100 to overcome those losses. A typical supplemental system would include a separate pump that receives power from an electrical or other power source other than the rotor drive shaft 102.

In many cases, the throttling valve 116 generates a considerable amount of heat during operation. Moreover, when the rotor 104 rotates at a relatively high rate and a regulation or modulation process of the rotating rotor 104 is commenced, a relatively high fluid flow rate out of a fixed-displacement implementation of the mechanically driven hydraulic pump 112 will be available to control rotation of the rotor 104; however, as braking continues, it will become more difficult for the rotor-regulation system 100 to control rotation of the rotor 104 due to limitations of the fixed-displacement implementation of the mechanically driven hydraulic pump 112 when same is sized for an initial stage of the braking process.

To address these concerns, a variable-displacement implementation of the mechanically driven hydraulic pump 112 that optimizes pump torque output to match the rotor speed as the rotor 104 rotation slows can be utilized. In addition, use of a variable-displacement implementation of the mechanically driven hydraulic pump 112 allows a smaller unit to be implemented because pump-design optimization for a middle displacement portion of the braking process becomes unnecessary. As a result, weight and space savings may be achieved; however, potential additional complexity and failure modes present with a variable-displacement pump relative to a fixed-displacement pump would need to be considered. The variable-displacement pump modulates flow through a fixed restriction, instead of varying the flow restriction as in the fixed-displacement pump case.

Figure 2:
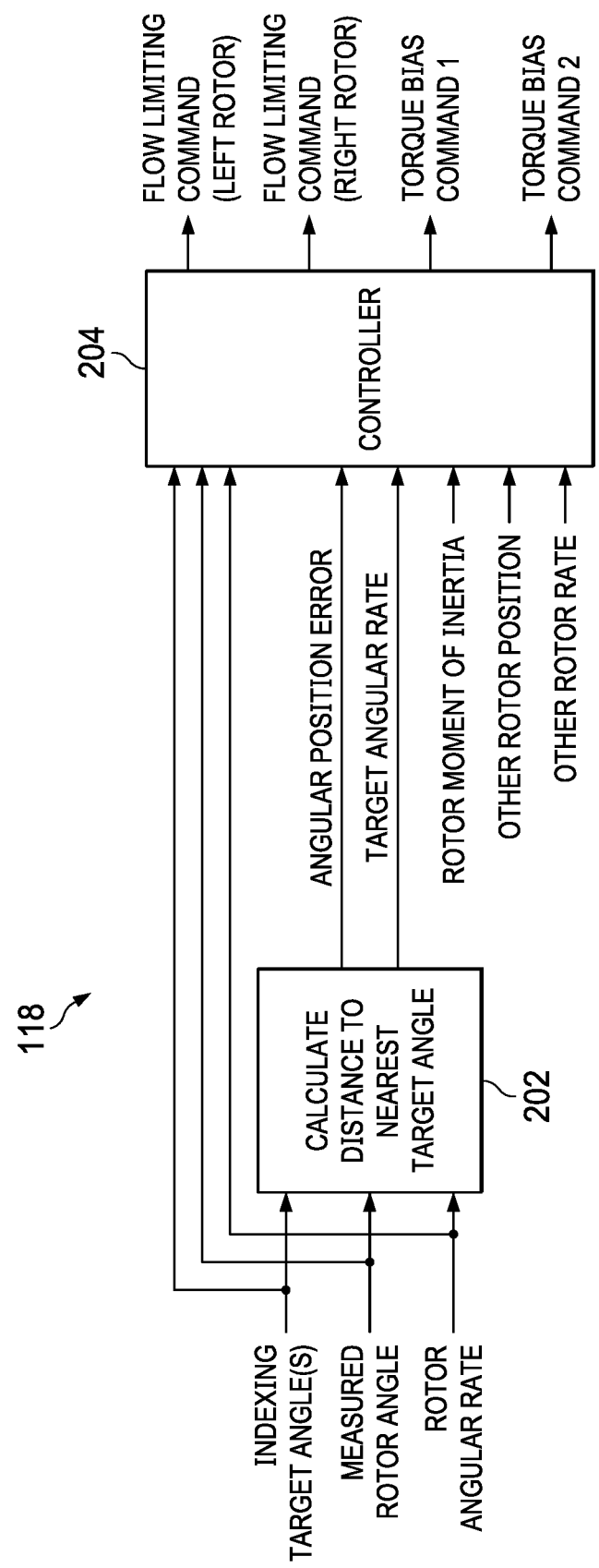
FIG. 2 is a functional block diagram that illustrates functionality performed by a computer of the rotor-regulation system of FIG. 1.

FIG. 2 is a functional block diagram that illustrates functionality performed by the computer 118 of the rotor-regulation system 100 of FIG. 1. As illustrated in FIG. 2, the computer 118 includes a distance-calculation engine 202 and a controller 204. The distance-calculation engine 202 operates to calculate a distance from a nearest indexing target angle to a current position of one or more of the rotors 104. Inputs to the distance-calculation engine 202 include one or more indexing target angles, the number of indexing target angles being dependent upon design of an indexing system within which the rotor 104 operates, and one or both of a measured angle of the rotor 104 and an angular rate of rotation of the rotor 104, the latter two inputs coming from the rotor transducer 106 via the transducer-signal line 122 in a typical embodiment. The angular rate of rotation of the rotor 104 may be derived or may be obtained by direct measurement. Each of the inputs to the distance-calculation engine 202 may also be input to the controller 204.

Outputs of the distance-calculation engine 202 include an angular position error, which is the difference between an angular position of the rotor 104 and the indexing target angle, and a target angular rate of rotation of the rotor 104. These outputs of the distance-calculation engine 202 are input to the controller 204. Other inputs to the controller 204 may include a moment of inertia of the rotor 104 as well as a position and rate of rotation of a second rotor 104 in embodiments that utilize multiple rotors 104, these inputs typically coming from the rotor transducer 106 via the transducer-signal line 122. In some embodiments in which multiple rotors 104 are used and an interconnect drive shaft is implemented, torsion zeroing may be achieved by the controller 204 monitoring the position of each rotor 104 and favoring a rate of rotation of a lagging rotor 104 and hindering a rate of rotation of a leading rotor 104.

The controller 204 outputs one or more flow limiting commands to the throttling valve 116, a flow limiting command being shown for each of a left and a right rotor 1044 in embodiments in which multiple rotors 104 are utilized. In some embodiments, rate of change of flow limiting may be employed in order to prevent inertia of the rotor 104 from causing pressure in the mechanically driven hydraulic pump 112 from exceeding a pre-defined threshold.

Also shown are torque bias commands, each of which can be designed to make adjustments to torque bias of the rotor blades 108 of a single rotor 104 or multiple rotors 104 depending upon design considerations. Torque biasing could be accomplished by counterbalancing residual engine torque via blade feathering. Other options to implement torque biasing may include an aerodynamic surface such a movable trim tabs on the rotor blades 108, active twist of the rotor blades 108, individual control of the rotor blades 108, and adjusting the portion of the feather-limiting hard stop from the mast structure. Static torque biasing could also be achieved via mechanically designed bias offsets, mechanical or electrical rigging, or mechanical shimming. Torque bias could also be accomplished, for example, by powering down a motor connected to the rotor drive shaft 102.

In a typical embodiment, the computer 118 can control the rotor 104 using the angular position error, the target angular rate of rotation, or both. For example, the computer 118 could adjust a rate command in continuous or discrete increments based on how close the rotor 104 is to a target angular position. A nearest target angle position may be missed if, for example, the rotor 104 is still rotating too fast when the rotor 104 reaches the target angular position. This could be due, for example, to aerodynamic spin-down of the rotor 104 upon reaching the target angular position.

In such a case, the target angular rotation rate may be increased to allow a rotational speed of the rotor 104 to re-accelerate until the rotor 104 again begins to approach the next target angular position. This would reduce the time needed for the rotor 104 to reach the next target angular position and tend to avoid the rotor 104 stopping rotating before reaching the next target angular position. In some cases, the computer 118 could not use angular rotation rate at all and could instead control the rotor 104 based on angular distance of the rotor 104 to the target angular position.

In particular embodiments, the computer 118 may perform one or more actions described or illustrated herein. In particular embodiments, one or more computer systems may provide functionality described or illustrated herein. In particular embodiments, hardware or encoded software running on one or more computer systems may perform one or more actions described or illustrated herein or provide functionality described or illustrated herein. Multiple computers could be used to distribute various functions and for purposes of redundancy.

Those having skill in the art will recognize that the concepts discussed herein can be implemented on aircraft of greatly varying sizes and configurations. Depending on those sizes and configurations, a mechanism for driving the mechanically driven hydraulic pump 112 other than the drive belt 110 may be employed such as, for example, a planetary gear system. In similar fashion, the mechanically driven hydraulic pump 112 need not necessarily be dedicated solely to regulation of rotation of the rotor 104 but could instead be used for other purposes as well, such as, for example, generating hydraulic power when no indexing operation is being undertaken. Moreover, different gear ratios and clutching could be used depending upon how the mechanically driven hydraulic pump 112 is to be used when not in use for regulation of rotation of the rotor 104. In addition, the valve-control line 120 and the transducer-signal line 122 can be wired or wireless dependent on design considerations.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A rotor-regulation system comprising:
a rotor comprising a plurality of blades;
a mechanically driven hydraulic pump;
a rotor drive shaft operable to drive the rotor and the mechanically driven hydraulic pump;
a throttling valve coupled to the mechanically driven hydraulic pump and operable to modulate rotation of the rotor;
a transducer operably coupled to the rotor drive shaft, wherein the transducer outputs at least one of an angular position or a rate of rotation of the rotor; and
a computer operably coupled to the transducer and the throttling valve, wherein the computer adjusts the throttling valve based at least in part on input received from the transducer so as to cause the rotor to stop at a desired position.

2. The rotor-regulation system of claim 1, wherein the transducer outputs at least an angular position of the rotor.

3. The rotor-regulation system of claim 1, comprising:
a fluid reservoir coupled between the throttling valve and the mechanically driven hydraulic pump; and
wherein the fluid reservoir receives fluid from the throttling valve and provides fluid to the mechanically driven hydraulic pump.

4. The rotor-regulation system of claim 1, comprising a secondary pump powered from outside the rotor-regulation system and operable to compensate for losses in the mechanically driven hydraulic pump.

5. The rotor-regulation system of claim 1, wherein the mechanically driven hydraulic pump is a fixed-displacement pump.

6. The rotor-regulation system of claim 1, wherein the mechanically driven hydraulic pump is a variable-displacement pump that regulates a load on the rotor-regulation system.

7. The rotor-regulation system of claim 1, wherein the rotor-regulation system recognizes a direction of rotor rotation and is operable to index and bias the rotor in either a clockwise or a counter-clockwise direction.

8. The rotor-regulation system of claim 1, wherein the computer is operable to control a plurality of rotors.

9. The rotor-regulation system of claim 1, wherein an engine driving the rotor drive shaft supplies residual torque to the rotor.

10. The rotor-regulation system of claim 1, wherein the computer is operable to issue a torque bias command.

11. The rotor-regulation system of claim 10, wherein the torque bias command controls feathering of at least one of the plurality of blades.

12. The rotor-regulation system of claim 10, wherein the torque bias command controls power being supplied to the rotor drive shaft.

13. A method of modulating rotation of a rotor comprising a plurality of blades, the method comprising:
rotating the rotor and a mechanically driven hydraulic pump via a rotor drive shaft;
receiving information indicative of a position and rate of angular rotation of the rotor; and
responsive to the receiving, modulating rotation of the rotor via a throttling valve coupled to the mechanically driven hydraulic pump, the modulating comprising adjusting the throttling valve based at least in part on the information so as to cause the rotor to stop at a desired position.

14. The method of modulating rotation of a rotor comprising a plurality of blades of claim 13, the method comprising issuing a torque bias command, the torque bias command controlling feathering of the plurality of blades.

15. The method of modulating rotation of a rotor comprising a plurality of blades of claim 13, the method comprising biasing the rotor via an aerodynamic surface, the aerodynamic surface comprising at least one of movable trim tabs on the blades, active blade twist, individual blade control, design bias offsets, rigging, and shimming.

16. The method of modulating rotation of a rotor comprising a plurality of blades of claim 13, the method comprising performing the method concurrently on two rotors of a rotorcraft comprising a plurality of rotors.

17. The method of modulating rotation of a rotor comprising a plurality of blades of claim 13, the method comprising issuing a torque bias command that controls power being supplied to the rotor drive shaft.

18. The method of modulating rotation of a rotor comprising a plurality of blades of claim 13, the method comprising:
monitoring the position of a plurality of rotors; and
favoring a rate of rotation of a lagging rotor of the plurality of rotors; and hindering a rate of rotation of a leading rotor of the plurality of rotors.

* * * * *